April 12, 1960     D. C. MODICA     2,932,109
FISH HOOK SETTER
Filed March 31, 1958
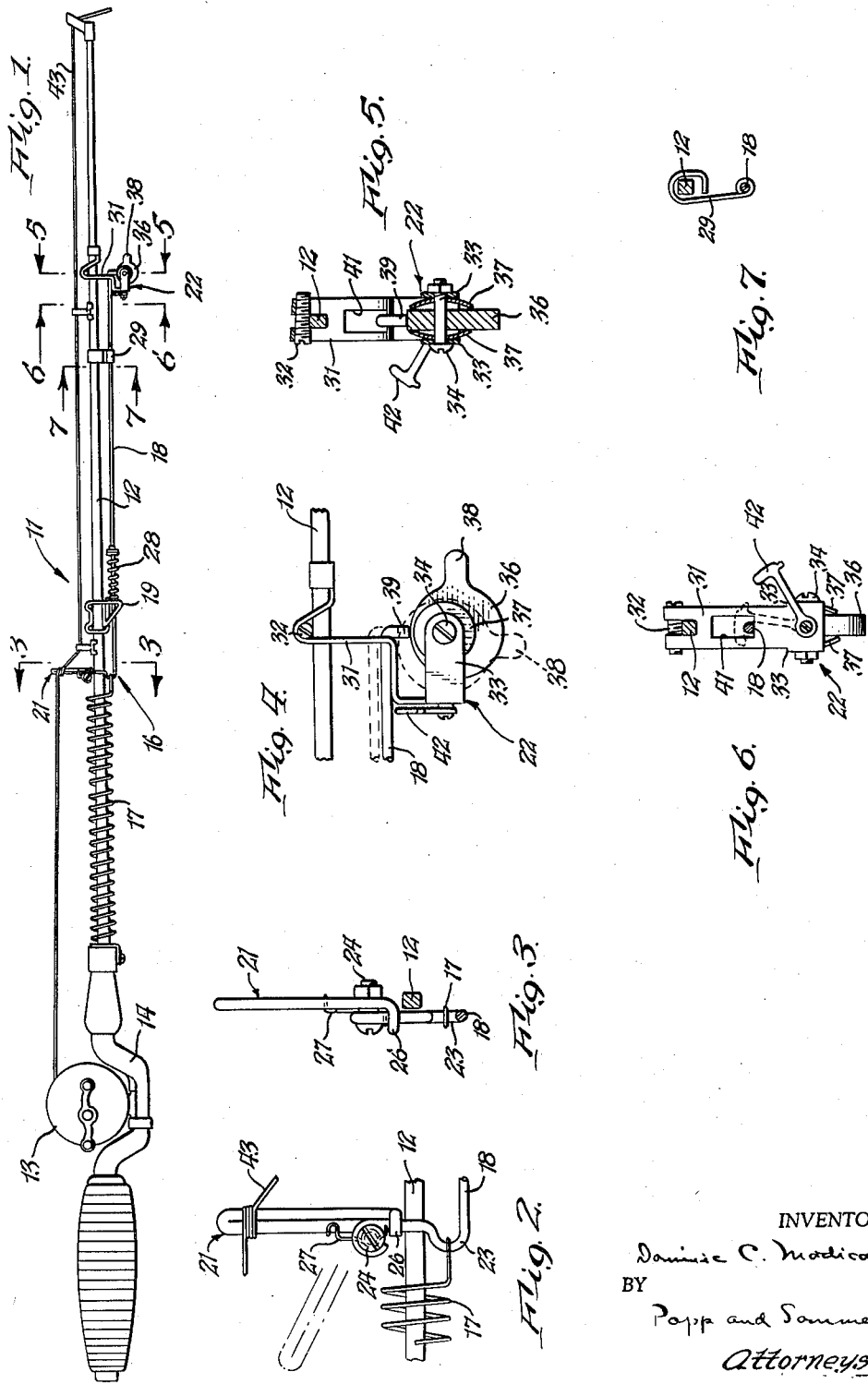
INVENTOR.
Dominic C. Modica
BY
Popp and Sommer
Attorneys.

United States Patent Office 2,932,109
Patented Apr. 12, 1960

2,932,109

FISH HOOK SETTER

Dominic C. Modica, Buffalo, N.Y.

Application March 31, 1958, Serial No. 725,303

8 Claims. (Cl. 43—15)

This invention relates to fishing apparatus, and more particularly to a fish hook setter that may be mounted upon a fishing rod and which automatically operates to set the hook when a fish takes the bait.

Various types of fish hook setters have been proposed and utilized with varying degrees of success and satisfaction in use. Most of the prior art devices of this type, and especially those using a spring means as a source of operational power, rely upon tension in the fishing line caused by the pull of the fish on the bait, to operate a trigger which releases the tensioned spring so that the line is jerked to set the hook.

The device of the present invention differs from such prior art devices by utilizing a different principle of operation. More particularly, the device of the present invention utilizes the flexing of the fishing rod in response to a pull on the line by the fish taking the bait, for releasing a spring held under tension to cause jerking of the line and the setting of the hook. Among the features and advantages characterizing the present invention, is a greater sensitivity of response and more reliable operation, together with a similplicity of structure and easy attachment to a fishing rod. In addition, the fish hook setter of the invention allows normal reel operation immediately after the setter spring is released.

The main object of this invention is to provide a fish hook setter that may be mounted upon a fishing rod and which automatically operates to set the hook when the fish takes the bait.

A more specific object of the invention is to provide a fish hook setter that is operated by a given amount of flexing of the fishing rod upon which it is mounted, which flexing is caused by a fish taking the bait.

Still another object is to provide a fish hook setter of high sensitivity and reliable operation, and which is simple in structure and easy to attach to a fishing rod.

A further object is to provide a fish hook setter that allows normal reel operation immediately after operation of the setter.

These and further objects and features of the invention will become more apparent from the following description and accompanying drawing wherein:

Fig. 1 is a view of a fish hook setter embodying the principles of the invention and showing it applied to a fishing rod.

Fig. 2 is an enlarged view of a fishing line attachment lever of the setter of Fig. 1;

Fig. 3 is an enlarged section view as seen from line 3—3 in Fig. 1;

Fig. 4 is an enlarged view of a trigger adjustment means of the setter of Fig. 1;

Fig. 5 is an enlarged section view as seen from line 5—5 in Fig. 1;

Fig. 6 is an enlarged section view as seen from line 6—6 in Fig. 1; and

Fig. 7 is an enlarged section view as seen from line 7—7 in Fig. 1.

Referring now to the drawing the numeral 11 identifies an assemblage including a fishing rod 12, a fishing reel 13 mounted upon a handle portion 14 of the rod, and a fish hook setter 16 embodying the principles of the invention. The latter includes a helical spring 17 surrounding the rod 12 near the handle portion 14, a trigger rod 18 arranged generally parallel with the fishing rod 12, a guide clamp 19 secured to the rod, a line attachment lever 21 for releasably retaining the line, and trigger piece assembly 22.

The spring 17 is affixed at one end to the handle portion 14 and at the other end to a hook portion 23 of the trigger rod 18. The attachment lever 21 is pivotally mounted by a bolt means 24 to the upper end of the hook portion 23, and has an arm 26 which engages the hook portion to limit the extent of rotary movement about the bolt means 24. A torsion spring 27 is arranged upon the bolt means 24, having one end in engagement with the hook portion 23, and the other end in engagement with the attachment lever 21, whereby the latter is constantly urged perpendicular relative to the rod 12.

A bumper spring 28 surrounds the trigger rod 18, and has one end in engagement with the guide clamp 19, which spring 28 serves to be engaged by a bracket 29 secured to the rod 18 and to absorb in part the recoil of the spring 17 during operation.

The trigger piece assembly 22 includes a bracket 31 the upper portion of which is arranged to embrace the rod 12 and is affixed thereto by means of a tapered screw 32, the lower portion having a pair of arms 33 supporting a shaft bolt 34 on which is rotatably positioned a cam 36. A pair of disc springs 37 are arranged on the shaft bolt 34 so as to engage the sides of the cam 36, whereby the rotative resistance of the cam may be varied by tightening or loosening the shaft bolt. The cam 36 is eccentrically mounted upon the shaft bolt, and has a finger portion 38 which may be used for manually rotating the cam to various angular positions of adjustment.

The forward end of the trigger rod 18 has a hook 39 which is adapted to pass through an opening 41 provided in the bracket 31 and to engage the bottom edge of the opening. It will be seen (Fig. 4) that the end of the hook 39 engages the periphery of the cam 36, and that by rotary adjustment of the latter, the degree of engagement between the hook and the edge of the opening 41, may be varied due to the eccentricity of the cam mounting. Thus the fish hook setter of the invention may be adjusted to provide varying degrees of sensitivity so that optimum operation may be realized for any given conditions, i.e., smooth or rough water, length of line, etc. A hook 42 is pivotally mounted on the bracket 31 so that it may be rotated into holding engagement with the trigger rod 18, and prevent release thereof from the bottom edge of the opening 41.

To operate the fish hook setter, the fish line 43 is first cast or let out in the usual manner. Next, the trigger rod 18 is pulled forward, stretching the spring 17, and the hook 39 is made to engage the bottom edge of the opening 41. The hook 42 is then swung into engagement with the trigger rod 18. Finally, the fishing line 43 is wrapped around the line attachment lever 21, and the hook 42 is swung out of engagement with the trigger rod 18; the fishing rod and fish hook setter are then in readiness, as shown in Fig. 1.

As soon as a fish takes the bait, the fish line 43 will be tensioned and the rod 12 will be bent or flexed downwardly relative to bracket 29. In so doing, the bracket 31 will move downward relative to the end of the trigger rod 18, and the bottom edge of the opening 41 will become disengaged from the hook end 39 of the trigger rod. The spring 17 will then cause the trigger rod 18 to quickly move backward, and the fishing line 43 will be jerked due to its attachment to the lever 21. Such jerking movement of the fishing line will cause the hook to be set in the mouth of the fish. As the reel 13 is then rotated, the lever 21 will be rotated counterclockwise (Fig. 1), and the fishing line 43 will be released therefrom and will be reeled in the normal manner.

It will be seen that the fish hook setter of the invention thus provides a convenient and reliable aid in catching fish with a rod and reel, and that the objectives of the invention as set forth hereinbefore are realized.

The foregoing description has been given in detail without thought of limitation since the inventive principles involved are capable of assuming other physical embodiments without departing from the spirit of the invention and the scope of the appended claims.

What is claimed is:

1. A fish hook setter for use with a fishing rod and reel comprising in combination a resilient means, a trigger rod arranged for substantially parallel movement relative to the fishing rod and being attached at one end to the resilient means and having a hook at the other end, a trigger piece assembly affixed to the fishing rod and being formed to receive in holding engagement the hook of the trigger rod, and a line attachment means affixed to the trigger rod and adapted to releasably retain a fishing line being held by the fishing rod and reel, said trigger piece assembly being movable relative to the trigger rod for releasing the hook of the trigger rod from holding engagement when the fishing rod is flexed a given amount.

2. A fish hook setter for use with a fishing rod and reel, comprising in combination, a helical spring surrounding the fishing rod, a trigger rod arranged for substantially parallel movement relative to the fishing rod and being attached at one end to the spring and having a hook at the other end, a trigger piece assembly affixed to the fishing rod and being formed to receive in holding engagement the hook of the trigger rod, and a line attachment means affixed to the trigger rod and adapted to releasably retain a fishing line being held by the fishing rod and reel, said line attachment means being movable relative to the reel for releasing the line upon rotation of the reel for reeling in the line, said trigger piece assembly being movable relative to the trigger rod for releasing the hok of the trigger rod from holding engagement when the fishing rod is flexed a given amount.

3. A fish hook setter for use with a fishing rod and reel comprising in combination, a helical spring surrounding the fishing rod and affixed thereto at one end, a trigger rod arranged for substantially parallel movement relative to the fishing rod and being attached at one end to the spring and having a hook at the other end, a trigger piece assembly affixed to the fishing rod and being formed to receive in holding engagement the hook of the trigger rod whereby the spring will be under tension, and a line attachment lever affixed to the trigger rod and perpendicular thereto and adapted to receive a fishing line being held by the fishing rod and reel, said line attachment lever being rotatable toward the reel through a 90° arc and releasing the line upon rotation of the reel for reeling in the line, said trigger piece assembly being movable relative to the trigger rod for releasing the hook of the trigger rod from holding engagement when the fishing rod is flexed a given amount toward the trigger rod.

4. A fish hook setter for use with a fishing rod and reel comprising in combination, a helical spring surrounding the fishing rod and affixed thereto at one end, a trigger rod arranged for substantially parallel movement relative to the fishing rod and at the bottom side thereof, said trigger rod being attached at one end to the spring and having a hook at the other end, a trigger piece assembly affixed to the fishing rod and being formed to receive in holding engagement the trigger rod hook, whereby the trigger rod will maintain the spring under tension, an adjustment means for regulating the degree of engagement between the trigger rod hook and the trigger piece assembly, said trigger piece assembly being movable downwardly relative to the trigger rod for releasing the trigger rod hook from holding engagement when the fishing rod is flexed a given amount toward the trigger rod, and a line attachment means affixed to the trigger rod and perpendicular thereto and being adapted to releasably retain a fishing line being held by the fishing rod and reel, said line attachment means being movable relative to the reel for releasing the line upon rotation of the reel for reeling in the line.

5. A fish hook setter according to claim 4, wherein said line attachment means comprises a lever rotatable toward the reel through a 90° arc, and a spring means is adapted to constantly urge the line attachment lever toward the prependicular to the fishing rod.

6. A fish hook setter according to claim 4, wherein the adjustment means is in the form of an eccentrically mounted cam the periphery of which is in engagement with the end of the trigger rod hook.

7. A fish hook setter according to claim 4, wherein a bumper spring is mounted upon the trigger rod and adapted to absorb part of the recoil resulting from the sudden tension release of the helical spring.

8. A fish hook setter according to claim 4, wherein a hook means is arranged on the trigger piece assembly and adapted to maintain the trigger rod hook in engagement with said trigger piece assembly.

References Cited in the file of this patent

UNITED STATES PATENTS

| | | |
|---|---|---|
| 671,914 | Nesbit | Apr. 9, 1901 |
| 2,590,721 | Muth | Mar. 25, 1952 |
| 2,640,290 | Ames | June 2, 1953 |
| 2,657,493 | Coles | Nov. 3, 1953 |